O. SMILEY.
MOTOR STETHOSCOPE.
APPLICATION FILED AUG. 9, 1919.
1,340,300.
Patented May 18, 1920.
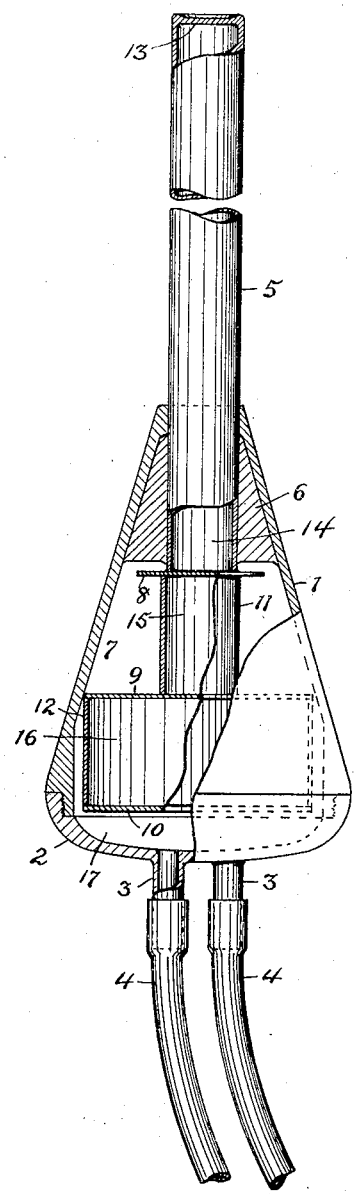
Orvall Smiley INVENTOR
BY
W. G. Burns ATTORNEY

UNITED STATES PATENT OFFICE.

ORVALL SMILEY, OF INDIANAPOLIS, INDIANA.

MOTOR-STETHOSCOPE.

1,340,300.  Specification of Letters Patent.  Patented May 18, 1920.

Application filed August 9, 1919. Serial No. 316,400.

*To all whom it may concern:*

Be it known that I, ORVALL SMILEY, a citizen of the United States, residing at Indianapolis, in the county of Marion and State of Indiana, have invented certain new and useful Improvements in Motor-Stethoscopes; and I do declare the following to be a full, clear, and exact description of the invention, such as will enable others skilled in the art to which it appertains to make and use the same.

This invention relates to improvements in stethoscopes for locating abnormal sounds in mechanical devices, particularly gas engines, and the object thereof is to so construct the device that sounds received by the instrument at the point of origin will become repeatedly amplified in successive stages before being transmitted to ears of the operator.

The object of the invention is accomplished by the construction illustrated in the accompanying drawing which is an elevation of the receiver shown partly cut away and in section. The characters of reference in the following description refer to the corresponding characters appearing on the drawing and having reference now to the same:

1 is a metallic shell of tapering form which is closed at its large end by a cap 2, the latter having tubular projections 3 extending therefrom for the attachment of flexible tubes 4 which are intended for connection with a headpiece (not shown) of the usual type to be applied to the operator's ears. Through the small end of the shell extends a hollow probe 5 that is closed at its outer end, its inner end being secured within the vertex of the shell by a deposit 6 of cement or other material capable of holding the probe in place.

Within the chamber 7 of the shell are located a series of diaphragms 8, 9 and 10 that are spaced apart and secured together by corresponding intervening cylindrical tubes 11 and 12 respectively of different diameters. The probe 5 is preferably made of a section of bamboo with its outer end formed at a joint 13 thereof so that it is closed and the inner end is closed by the diaphragm 8 which is glued or otherwise secured thereto. The cylindrical tube 11 is closed at one end by the diaphragm 8 and at its other end by the diaphragm 9 to which it is similarly secured, and one end of the tube 12 is closed by the diaphragm 9 and at its other end by the diaphragm 10 in like manner. The probe, diaphragms and the intervening cylindrical tubes are arranged in concentric relation and are rigidly grouped together, their structure affording a succession of closed chambers 14, 15 and 16 of differing proportions.

The diaphragms and the intervening tubes are composed of very thin light wood or other stiff material capable of being vibrated by sound and are rigidly fixed in connection with the probe so that minute vibrations thereof or those in its chamber 14 will be imparted to the other chambers in the sequence of their order of arrangement. The cap 2 is formed upon the interior with an auditory cavity 17 adjacent the end diaphragm 10 from which sounds are observed by the operator through the tubes 4 and the projections 3.

In using the device the probe is applied to the motor or other mechanical object at a location thereon where defective operation is suspected or which is to be examined, and the vibrations occasioned by the action of machinery in the immediate vicinity are absorbed by the probe and transmitted to the diaphragms in succession through the intervening tubes in amplified form which renders them readily detectable by the operator.

What I claim is:—

1. In a stethoscope, a shell; a hollow probe extending from the shell and having a closed chamber therein; a series of diaphragms spaced apart within the shell one of which is rigidly fixed to the inner end of the probe; and a corresponding series of intervening tubes fixed between the diaphragms respectively.

2. In a stethoscope, a shell having a cover for closing one end thereof, there being tubes having communication with the interior of the shell, a closed hollow probe projecting outwardly from one end of the shell and extending into the interior thereof; a series of diaphragms spaced apart within the shell one of which has rigid connection with the probe; and a corresponding series of intervening tubes arranged respectively between the diaphragms and having fixed relation therewith, the structure formed by the probe, diaphragms and intervening tubes having a succession of disproportionate chambers.

3. In a stethoscope, a shell having an auditory cavity therein and tubes having communication with the cavity; and an amplifying vibratory member having therein a succession of chambers, the member being positioned within the shell with one end thereof protruding therethrough and forming a probe.

4. In a stethoscope, a vibratory member having therein a succession of chambers, one end of the chamber forming a hollow probe.

5. In a stethoscope, a vibratory member comprised of a hollow probe; a series of diaphragms spaced apart, one of which has fixed relation with the probe; and a series of interventing tubes arranged fixedly between the corresponding diaphragms.

In testimony whereof I have hereunto set by hand in the presence of two subscribing witnesses.

ORVALL SMILEY.

Witnesses:
LUTHER WILLIAMS,
M. SCOTT SMITH.